March 10, 1964    E. C. L. DE FAYMOREAU ETAL    3,124,800
ELECTRONIC SWITCHING DEVICE
Filed Aug. 4, 1959
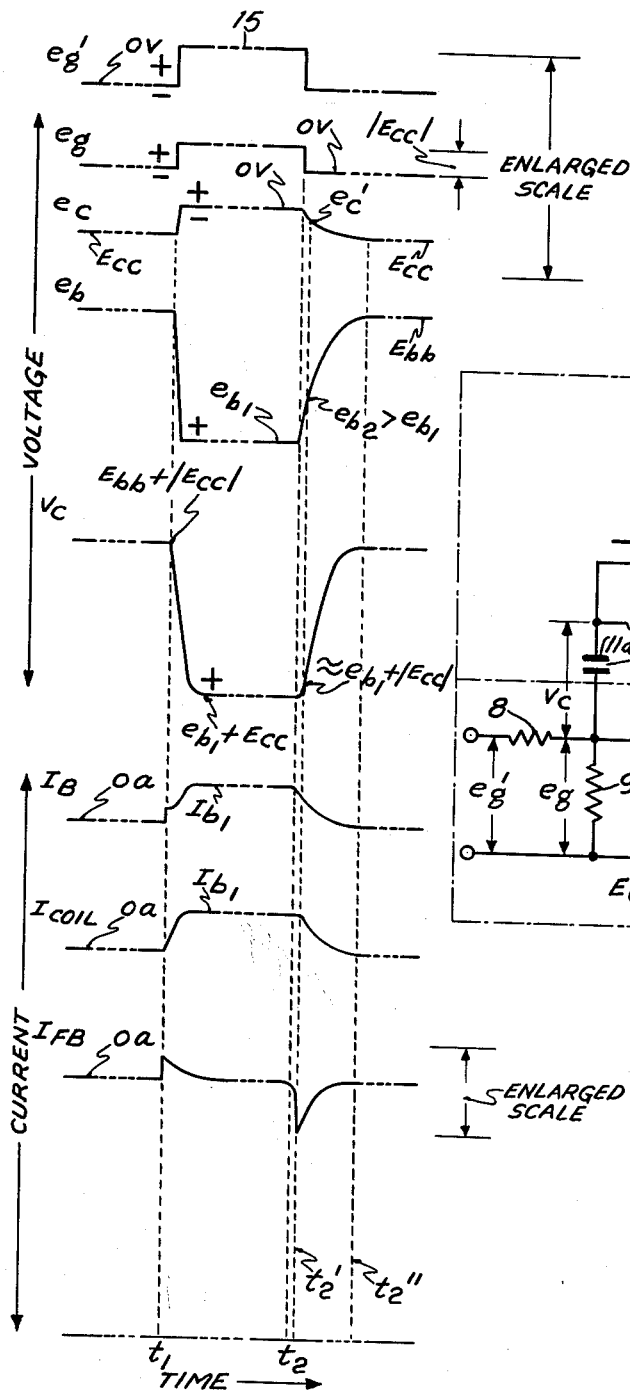
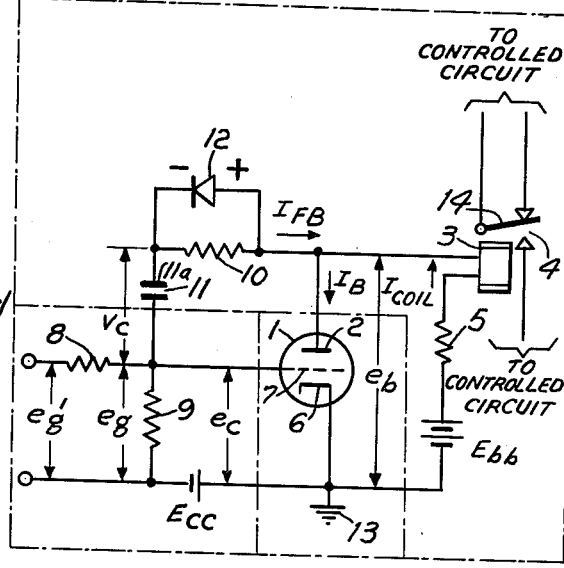
INVENTORS.
ETIENNE C. L. de FAYMOREAU
MARK MANDEL
BY
ATTORNEY

United States Patent Office 3,124,800
Patented Mar. 10, 1964

3,124,800
ELECTRONIC SWITCHING DEVICE
Etienne C. L. de Faymoreau, Nutley, and Mark Mandel, Bloomfield, N.J., assignors to International Telephone and Telegraph Corporation, Nutley, N.J., a corporation of Maryland
Filed Aug. 4, 1959, Ser. No. 831,557
5 Claims. (Cl. 343—106)

This invention relates to electronic switching devices and more particularly to circuits for delaying the de-energization of a current responsive device as for example, in the case of a relay, delaying the release of its armature for a certain period of time after the controlling current has been interrupted.

The delaying of the de-energization of a current responsive device is an operation required in many electrical systems.

One such system is a receiver utilized in the "TACAN" network. In our co-pending United States patent application, Serial No. 683,122, filed September 10, 1957, now Patent Number 2,916,738, granted December 8, 1959, and entitled "Searching and Tracking Receiver" there is disclosed one such type of receiver.

In the aerial navigation system known as TACAN, there are included pulse-emitting beacon or ground transmitters and mobile station receivers, such as, for example, those carried on airplanes. The transmitting antenna system in the beacon produces a multilobed directional pattern rotating at about 15 cycles per second. To a receiver receiving the pulse signals from the transmitter, the rotation of the antenna pattern produces an amplitude modulation envelope on these pulses, the phase of which envelope varies at different azimuthal angles from the beacon station. When the major lobe of the directional pattern points in a given direction, such as north, a special signal in the form of a short burst of pulses is transmitted from the beacon, which signal is referred to as the "north" or "main" reference signal. By comparing the phase of the modulation envelope, due to rotation of the beacon pattern, with that of the north signal, an indication of the bearing of the receiver with respect to the beacon is obtained. If only the north signal and a single-lobed directional pattern are employed, only a relatively coarse indication of bearing would be obtainable. To obtain a finer indication, the directional pattern is multi-lobed with each lobe separated, for example, by 40 degrees from the next and with auxiliary reference pulse signals in the form of short bursts of pulses being emitted each time one of these lobes passes the predetermined reference point, i.e., north, as the pattern is rotated. The rotation of this pattern produces a modulation envelope of 135 cycles per second, 9 lobes multiplied by 15 cycles per second, on top of the fundamental of 15 cycles per second due to the main directive lobe. At the receiver, the phase of the auxiliary pulse signals is compared with respect to that of the 135 cycles-per-second modulation envelope; and a fine indication is thereby obtained in addition to the coarse one.

Actually in TACAN, the coarse indication gives the 40-degree sector of the azimuthal angle of the mobile receiver with respect to the beacon; and the more precise angle within this 40-degree sector is found by the comparison of the auxiliary reference pulse signals with the corresponding 135 cycle-per-second signal. The 40-degree sector is found and thereafter maintained by a searching and tracking operation involving the north reference pulse and the 15 cycle-per-second wave. For this purpose, the incoming pulses which carry the amplitude modulation of the 15 cycle-per-second envelope are filtered to derive a 15 cycle-per-second wave. This wave is then phase-shifted by continuously increasing amounts; and from the phase-shifted wave, there is then produced a gating pulse which is therefore likewise continuously phase shifted and is applied to a coincidence circuit to which the north reference pulse signal, as detected, is likewise applied. When coincidence occurs between the gating pulse and the detected north reference pulse, the system is switched from a searching to a tracking operation with the tracking being controlled for finer indication by phase comparison of the auxiliary reference signals and the 135 cycle-per-second wave. The continued coincidence of the north pulse and the gating pulse maintains the system in tracking position.

Switching from the searching to a tracking operation is accomplished in the aforementioned application, by a relay which is controlled by a relay control circuit which in turn is responsive to the output of the coincidence circuit. The relay control circuit consists of a tube arrangement having the coil of the relay located in its plate circuit. During the search operation the tube is not conducting and consequently the relay is de-energized. When there is coincidence between the gating pulse and the detected north reference pulse, the coincidence circuit produces an output which causes current to flow in the plate circuit of the relay control circuit and accordingly in the relay coil.

It is desirable during tracking to prevent the system from going unnecessarily back to the "search" condition. One of the reasons this may occur is that there may be a momentary shift in phase of the 15 cycle-per-second wave due to such factors as interference, a momentary weakening or loss of the signal, etc. There are also certain phase shifts that are difficult to compensate for which occur in this system; and tolerences for these uncontrolled phase shifts must be built into the equipment and, therefore, into the tracking gate. Furthermore, during the tracking period, the auxiliary pulses and the 135 cycle-per-second wave control the system; and if the azimuthal change of the plane in flight is rapid and the tracking gate is too narrow, then the system would tend to jump rather frequently from tracking to searching as the plane cuts across the 40-degree sectors.

It is therefore, an object of this invention to provide a switching device which is fast acting but has a slow release.

Another object is to provide a simplified and inexpensive means for delaying the de-energization of a relay coil when the energizing stimulus ceases, whereby the relay may be of standard and simple construction.

A further object, as applied to a TACAN receiver, is to provide a suitable time delay to allow the tracking operation to continue before the searching operation becomes effective.

This invention accordingly features the use of a condenser and a diode in a feedback path of a relay control tube.

The above-mentioned and other features and objects of the invention will become more apparent by reference to the following description taken in conjunction with the accompanying drawings, in which:

FIG. 1 is a schematic diagram of the preferred embodiment of this invention;

FIG. 2 is a graphic representation of waveforms helpful in explaining the operation of the invention. The waveforms are ideally and relatively represented to facilitate their illustration and understanding of the invention and are not necessarily drawn to the same scale on the vertical axis.

Referring to FIG. 1, the high gain triode 1 has coupled to its plate 2, the coil 3 of a relay 4. Serially connected to the relay coil 3 is the plate supply $E_{bb}$ and plate resistor 5 which limits the current in the plate circuit. The relay 4 controls an external circuit by means of its armature 14. The negative side of the plate supply $E_{bb}$ is connected to the cathode 6 of the tube 1.

Coupled to the grid 7 is a voltage divider network comprising resistors 8, 9. The grid 7 is biased by the grid supply $E_{cc}$ and as shown in the embodiment the grid supply has its positive terminal connected to the cathode 6.

Coupled between the plate 2 and the grid 7 is a feedback circuit comprising a resistor 10 and capacitor 11 connected in series. Shunted across the resistor 10 is a diode 12. The diode 12 is illustrated with its polarity markings to indicate the polarity required on its terminals for conduction.

The circuit is illustrated as grounded at 13 merely to simplify the explanation of its operation, which follows:

Referring to FIGS. 1 and 2, immediately prior to the time $t_1$, there is no stimulus signal $e_g'$ applied to the input of the voltage divider circuit 8, 9 and consequently no voltage drop $e_g$ will be present across resistor 9. Also, immediately prior to $t_1$ and by which time the circuit will have had sufficient time to reach its steady state condition, the following conditions will exist. By maintaining $E_{cc}$ at a negative threshold value just sufficient to cut-off the triode 1, no grid current will flow in the grid to cathode circuit, and no plate current $I_b$ will flow in the plate circuit and consequently in the relay coil 3. The grid input voltage $e_c$ appearing between the grid 7 and cathode 6 will be $E_{cc}$. As the triode is not conducting, the plate 2 will be at the plate supply voltage $E_{bb}$ as well as the positive terminal of the diode.

With the triode 1 not conducting it effectively represents an open circuit, so that the capacitor 11 is serially connected to the relay coil 3, the resistors 5, 9, 10 and the $E_{bb}$ and $E_{cc}$ voltage supplies. The inductive effects of the coil are negligible so that the time constant for this circuit can be represented effectively by the product of the capacitor 11 and the sum of the resistors 5, 9, 10 and the resistance of coil 3. When the capacitor is fully charged it will have a potential across it equal to the sum of $E_{bb}$ and the absolute value of $E_{cc}$ and have a positive potential on its upper plate 11a.

With respect to ground, the voltage appearing at the negative terminal of the diode 12 will be of the same value and polarity as that appearing at its positive terminal, i.e. $E_{bb}$, and consequently the diode 12 will be unable to conduct. There will be no current flow $I_{FB}$ in the plate to grid path when the capacitor is fully charged and the diode is unable to conduct.

At time $t_1$, a positive stimulus voltage $e_g'$ appears. By suitable choice of the resistors 8, 9, the voltage of $e_g'$ across resistor 9 will overcome the absolute value of $E_{cc}$ and provide a positive voltage $e_g$ thereby causing the tube 1 to conduct. The grid input voltage $e_c$ will then always be maintained at a value of zero or a slightly negative value because of the grid clamping action in the triode grid to cathode circuit.

The rise in $e_c$, however, is not instantaneous due to inherent characteristics of the tube circuit and consequently the drop $e_b$ across the plate is not instantaneous.

The capacitor 11 will now begin to discharge as the triode begins to conduct. However, since the positive polarity on plate 11a of the capacitor appearing on the negative terminal of the diode will always be greater than or equal to that on the diode positive terminal, the diode will be unable to conduct. The capacitor 11 will discharge through the conducting triode via resistor 10 and the voltage drop finally appearing across it will be equal to the absolute value of $E_{cc}$ plus $e_{b1}$, the latter being the final voltage appearing across the plate after steady state conditions prevail.

The plate current $I_B$ rises corresponding to the drop in plate voltage and will include the feedback current $I_{FB}$ which is the current being discharged by the capacitor 11. The current in the relay coil 3 gradually begins to rise until it reaches the value $I_{b1}$ which is the steady state plate current. When the capacitor 11 reaches its steady state condition the feedback current $I_{FB}$ will no longer exist and the current in the relay coil will equal the plate current $I_{b1}$.

When $t$ equals $t_2$, the stimulus voltage $e_g'$ ceases with a consequential drop $e_g$ appearing across resistor 9. The drop in $e_c$, however, as before is not instantaneous and consequently the rise $e_b$ across the plate is also gradual. When the plate voltage $e_b$ reaches a value $e_{b2}$ which appears on the positive terminal of the diode 12 and is greater than the value of $e_{b1}$, the approximate voltage with respect to ground appearing on the diode's negative terminal, the diode 12 begins to conduct. This occurs at the time $t_2'$ when the grid input voltage is at a value $e_c'$. During this period between $t_2$ and $t_2'$ the rise $V_c$ across the capacitor 11 is negligible.

At $t_2'$ the diode begins to conduct thus shorting out the resistor 10 and the circuit effectively becomes a Miller integrating circuit as the diode resistance is negligible. Under this condition, the input characteristic impedance of the circuit becomes quite large causing the grid input signal $e_c$ to decline at a much slower rate than immediately previous to the diode's conduction; i.e., previous to $t_2'$. This slow rate of decline of $e_c$ influences proportionally the rate of rise of the plate voltage $e_b$. During this period the plate current begins to decrease at a rate proportional to the rate of rise of the plate voltage. In a similar manner the relay coil current also decays at a corresponding proportional rate.

During the period $t_2$ to $t_2'$ the feedback current $I_{FB}$, which now flows in a direction opposite to the one illustrated in FIG. 1, tends to charge the capacitor 11 through the resistor 10 but is very slow. At $t_2'$ when the circuit initially starts to act as a Miller integrator, the charging or feedback current $I_{FB}$ is larger than with the diode in its former non-conducting state. Thereafter, the feedback charging current decreases at a rate proportional to the rate at which the plate signal voltage $e_b$ rises and consequently the capacitor voltage rises accordingly. From $t_2$ to $t_2''$ the relay coil current is a composite of $I_{FB}$ and $I_B$.

At $t_2''$ the grid signal voltage $e_c$ equals $E_{cc}$ and thus cuts off the triode plate current and corresponding coil current. Likewise, the plate drop across the triode is again equal to $E_{bb}$ and the drop across the capacitor returns to $E_{bb}$ plus the absolute value of $E_{cc}$ and at which time no current will flow in the feedback path. The diode 12 at $t_2''$ will no longer conduct since the polarity and potential with respect to ground on its negative terminal will be the same as that appearing on its positive terminal, namely, $E_{bb}$. At this time, the cycle is ready to repeat itself.

The characteristics of the Miller integration circuit effectively increases the release time, as illustrated in the waveforms, of the relay coil from the period $t_2$ to $t_2''$. This increase of the release time provides a slow release of the armature 14 and thus allows the circuit it controls to be effective during this period.

As applied to TACAN, $e_g'$ represents the output signal from the coincidence circuit. The period from $t_1$ to $t_2$ corresponds to the tracking, while $t_2$ represents the time at which the output signal is temporarily lost. If for any reason, the receiver was to momentarily lose the signal caused, for example, by a momentary weakening of the signal, and thereby attempt to return to the search condition the effect of this circuit would be to temporarily delay the search condition from taking effect as the armature 14 of the relay 4 would be temporarily held on the tracking position for the period corresponding between $t_2$ and $t_2''$.

The waveforms in FIG. 2 have been shown as discontinuous, as for example, as shown at 15, to clearly indicate that the stimulus signal may be of any duration as long as there is adequate time for the circuit to achieve its various steady state conditions.

While we have described above the principles of our invention in connection with specific apparatus, it is to be clearly understood that this description is made only by way of example and not as a limitation to the scope of our invention as set forth in the objects thereof and in the accompanying claims.

We claim:

1. A switching control circuit comprising an amplifier device having at least first, second and third electrodes, a current-responsive device having at least two stable output signal producing conditions connected to said first electrode, a source of input energy coupled to said second electrode to control the operation of said amplifier device and maintain said current responsive device in a predetermined one of said stable conditions, and means connected to said first and second electrodes to maintain said current responsive device in said predetermined stable condition for a predetermined interval of time whenever said input energy is interrupted, and should any such interruption be shorter than said predetermined interval of time said current responsive device will remain in said predetermined stable condition.

2. A switching control circuit comprising an amplifier device having at least first, second and third electrodes, a current responsive device having at least alternative first and second stable output signal producing conditions connected to said first electrode, a source of input energy coupled to said second electrode to control the operation of said amplifier device comprising a source of bias voltage to maintain said current responsive device at said first stable input signal producing condition and a source of input signals to render ineffective said source of bias and maintain said current responsive device at said second stable output signal producing condition, and a feedback circuit comprising an energy storage device connected to said first and second electrodes to maintain said current responsive device in said second stable output signal producing condition for a predetermined interval of time whenever said input signal is interrupted.

3. A switching control circuit comprising an electron discharge device having at least first, second and third electrodes, a relay comprising a coil connected to said first electrode and an armature having a first signal producing position whenever said electron discharge device is non-conductive and a second signal producing position whenever said electron discharge device is conductive, a source of bias voltage connected to said second electrode to prevent conduction of said electron discharge device, a source of input signals further connected to said second electrode to render ineffective said source of bias and cause said electron discharge device to conduct, a feedback path connected to said first and second electrode comprising an energy storage means serially connected to a resistor, and means to maintain said armature at said second signal producing position for a predetermined period of time whenever said source of input signals is interrupted, said latter means comprising a normally non-conductive unilateral current device connected in parallel with said resistor, said unilateral current device cooperating with said energy storing means to become conductive during said interruption of said input signals to maintain effectively the conduction of said electron discharge device.

4. A switching control circuit comprising a vacuum tube amplifier device having at least a plate, a grid, and a cathode, a relay comprising a coil in the plate circuit of said amplifier device and an armature having a first signal producing position whenever said electron discharge device is non-conductive and a second signal producing position whenever said amplifier device is conductive, a source of threshold bias voltage connected to said grid to prevent conduction of said electron discharge device, a source of input signals further connected to said grid to render ineffective said source of bias and cause said amplifier device to conduct, a negative feedback path connected to said grid and said plate comprising a condenser and resistor serially connected and means to maintain said armature at said second signal producing position for a predetermined period of time whenever said source of input signals is interrupted, said latter means comprising a normally non-conductive diode connected in parallel with said resistor and cooperating with said condenser to become conductive during said interruption of said input signals to maintain the conduction of said amplifier device for said predetermined period of time.

5. In a direction finding receiver having alternate searching and tracking operations adapted respectively to detect signals and to maintain contact with said signals upon their detection, means to maintain said receiver in tracking relation with said signals for a predetermined period of time whenever there is an interruption of said signals so that should an interruption be for a period of time less than said predetermined period said receiver is maintained in said tracking relation, comprising an amplifying device having first, second and third electrodes, a relay having a coil connected to said first electrode, said relay further comprising an armature having a first position to maintain said searching relation whenever said coil is de-energized and a second position to maintain said tracking relation whenever said coil is energized, a source of bias voltage supply connected to said second electrode to maintain said amplifying device non-conductive during the said search relation, a source of input energy further connected to said second electrode to overcome the effect of said source of bias and maintain said amplifying device conductive during said tracking relation, a feedback path circuit connected to said first and second electrodes comprising a condenser and resistor serially connected, a normally non-conductive diode connected in parallel with said resistor and cooperating with said condenser to become conductive during said interruption of said signals to maintain the conduction of said amplifying device and consequent energization of said coil during said interruption.

References Cited in the file of this patent

UNITED STATES PATENTS

| | | |
|---|---|---|
| 2,483,126 | Davids | Sept. 27, 1949 |
| 2,591,810 | Hart | Apr. 8, 1952 |
| 2,916,738 | De Faymoreau et al. | Dec. 8, 1959 |
| 2,980,827 | Hill | Apr. 18, 1961 |
| 2,981,850 | Hoskinson | Apr. 25, 1961 |

FOREIGN PATENTS

| | | |
|---|---|---|
| 892,779 | Germany | Oct. 12, 1953 |